(12) United States Patent
Regan et al.

(10) Patent No.: US 10,178,499 B2
(45) Date of Patent: Jan. 8, 2019

(54) VIRTUAL STATIONARY SATELLITES OVER ANY AREA OF THE EARTH FOR A CONTINUOUS OR SET AMOUNT OF TIME

(71) Applicant: THE UNITED STATES OF AMERICA AS REPRESENTED BY THE ADMINISTRATOR OF NASA, Washington, DC (US)

(72) Inventors: Curtis R. Regan, Norfolk, VA (US); Stephen J. Horan, Poquoson, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 15/958,350

(22) Filed: Apr. 20, 2018

(65) Prior Publication Data
US 2018/0310124 A1    Oct. 25, 2018

Related U.S. Application Data

(60) Provisional application No. 62/488,239, filed on Apr. 21, 2017.

(51) Int. Cl.
| | | |
|---|---|---|
| B64G 1/10 | (2006.01) | |
| G06F 17/30 | (2006.01) | |
| H04B 7/185 | (2006.01) | |
| H04W 4/021 | (2018.01) | |
| H04W 4/02 | (2018.01) | |

(52) U.S. Cl.
CPC .......... *H04W 4/021* (2013.01); *B64G 1/1021* (2013.01); *B64G 1/1085* (2013.01); *G06F 17/30241* (2013.01); *H04B 7/1853* (2013.01)

(58) Field of Classification Search
CPC ....... H04W 4/02; H04W 4/023; H04W 4/029; H04W 64/00
See application file for complete search history.

(56) References Cited

U.S. PATENT DOCUMENTS

| | | |
|---|---|---|
| 9,924,109 B2 | 3/2018 | Brav et al. |
| 9,942,583 B2 | 4/2018 | Brav et al. |
| 2014/0250300 A1* | 9/2014 | Runkis ................ G06F 21/6218 713/165 |

(Continued)

FOREIGN PATENT DOCUMENTS

WO    WO-2014121197 A2 *    8/2014    ............. G01S 19/14

OTHER PUBLICATIONS

Chander, Gyanesh, "SSTL UK-DMC SLIM-6 Data Quality Assessment," IEEE Transactions on Geoscience and Remote Sensing, Jul. 2009, pp. 2380-2391, vol. 47. No. 7.

(Continued)

*Primary Examiner* — Diane D Mizrahi
(74) *Attorney, Agent, or Firm* — Robin W. Edwards; Mark P. Dvorscak

(57) ABSTRACT

Various embodiments may provide systems and methods for achieving continuous measurements (e.g., continuous video images) of the same spot on the Earth using Low Earth Orbit (LEO) satellite constellations and/or Middle Earth Orbit (MEO) satellite constellations. Various embodiments may provide a system of Virtual Low Earth Orbit (LEO) Stationary Satellites (VLSSs) over any area of the Earth for a continuous or a periodic amount of time.

18 Claims, 8 Drawing Sheets

(56) References Cited

U.S. PATENT DOCUMENTS

| | | | |
|---|---|---|---|
| 2016/0188996 A1* | 6/2016 | Modica | G01S 17/023 382/203 |
| 2016/0189385 A1* | 6/2016 | Modica | G01S 17/89 382/103 |

OTHER PUBLICATIONS

Henry, Caleb, "Startup with SoftBank, Airbus Investment Planning Video Constellation with Several Hundred Satellites", SPACENEWS, Apr. 18, 2018, available at http://spacenews.com/startup-with-softbank-airbus-investment-planning-video-constellation-with-hundred-satellites/, accessed Apr. 19, 2018.

* cited by examiner

VIRTUAL STATIONARY SATELLITES OVER ANY AREA OF THE EARTH FOR A CONTINUOUS OR SET AMOUNT OF TIME

CROSS-REFERENCE TO RELATED PATENT APPLICATION(S)

This patent application claims the benefit of and priority to U.S. Provisional Application No. 62/488,239, filed on Apr. 21, 2017, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Low Earth Orbit (LEO) and Medium Earth Orbit (MEO) satellites are constantly moving in orbit around the Earth. As such, the availability to make measurements over the same spot on the Earth is limited by the movements of the LEO or MEO satellites, with revisit times (also referred to as cadences or revisit rates) to the same spot with the same viewing angle limited to less than once per day up to two or three times per month, depending upon the orbit specifics. For earth science, National Ocean and Atmospheric Administration (NOAA), and Government applications, a more useful periodicity for measurements over the same spot on the Earth would be many times in the same day, and providing continuous measurements (e.g., continuous video images) of the same spot on the Earth would be best.

BRIEF SUMMARY OF THE INVENTION

Various embodiments may provide a system of Virtual Low Earth Orbit (LEO) Stationary Satellites (VLSSs) over any area of the Earth for a continuous or a periodic amount of time. Various embodiments may provide a VLSS system including a constellation of LEO satellites each including an instrument payload. While the LEO satellites in the constellation of LEO satellites may be continually moving relative to the surface of the Earth, the arrangement of the constellation orbital planes and satellites within those planes may provide coverage such that at any given time a position on the surface of the Earth may be measurable by one or more instruments in at least one of the instrument payloads. In this manner, the system, including the constellation of LEO satellites each including an instrument payload, may provide a VLSS because at least one instrument may provide coverage over a selected area at any given time. Various embodiments may provide a data cloud interface configured to enable a user to select a user area of interest on the surface of the Earth. In response to the user's selection of a user area of interest on the surface of the Earth via the data cloud interface, satellite commands to the constellation of LEO satellites may be generated to ensure at least one instrument may provide coverage over the user area of interest at any given time. These orbital characteristics of LEO satellite constellations also apply to MEO satellite constellations and the various embodiments may also use MEO satellites to provide a Virtual Medium Earth Orbit (MEO) Stationary Satellite (VMSS).

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1A:
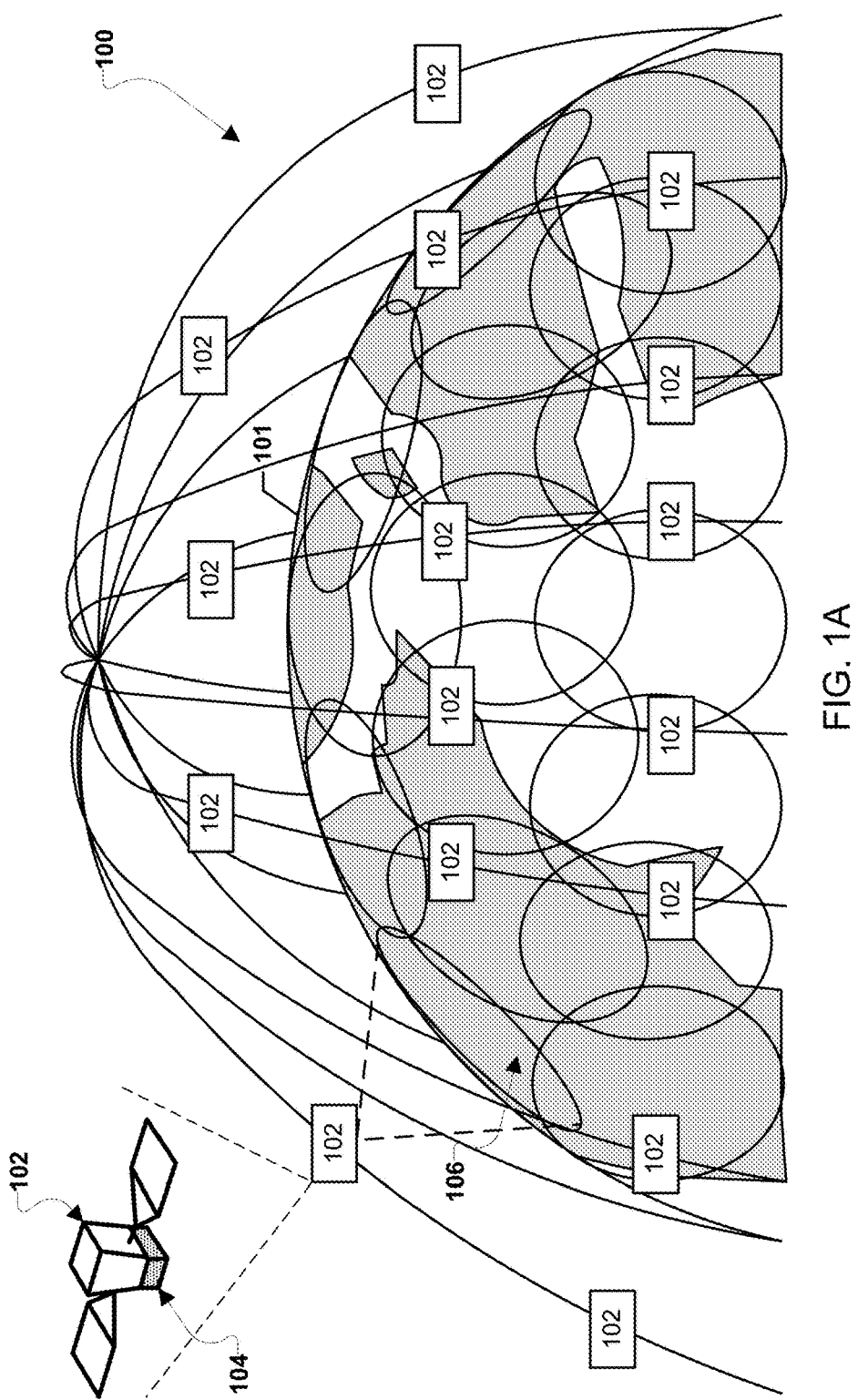
FIG. 1A is a system diagram of a system of Virtual Low Earth Orbit (LEO) Stationary Satellites (VLSSs) suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" refers to any one or all of cellular telephones, smart phones, personal or mobile multi-media players, personal data assistants (PDAs), laptop computers, personal computers, tablet computers, smart books, palm-top computers, embedded computers, wireless electronic mail receivers, multimedia Internet enabled cellular telephones, wireless gaming controllers, satellite or cable set top boxes, streaming media players, smart televisions, digital video recorders (DVRs), and similar electronic devices which include a programmable processor and memory and circuitry for performing the operations described herein.

As used herein, the term "satellite constellation" refers to an arrangement of cooperating satellites placed in Low Earth Orbit (LEO) or Medium Earth Orbit (MEO) in one or more orbital planes spaced around the Earth having one or more satellites in each plane. To provide coverage continuity, constellation designers may space the orbital planes and the numbers of satellites within the plane to provide at least one, and often more than one, satellite with visibility of a single geographic point on the Earth. The multiple-satellite visibility results from having one or more satellites in one or more orbital planes above the designated spot's visible horizon at each moment. While the spot remains stationary, the orbital motions bring successive satellites in the various planes into view according to the laws of orbital mechanics. Each satellite may have provisions for supporting necessary data communications, instrument accommodations for space and power, and enabling pointing of the instruments to the desired point through appropriate means for that satellite.

As used herein, the term "remote sensing data" refers to electromagnetic-based or particle-based measurements of areas of interest. In the various embodiments these measurements may be visual scenes, infrared scenes, radar measurements, thermal measurements, solar occultation measurements, spectral radiation measurements, electron measurements, neutron measurements, and other similar measurements made with electronic or electromechanical devices and the collected data is returned to the user for their application. The user may combine multiple data sources to produce derivative products, such as 3D video or multi-parameter measurements, based on their application needs.

As used herein, the term "LEO Staring" refers to the process of combining multiple scene images taken by one or more satellites over a time period and subsequently combining those individual images to produce a size-corrected, aspect-angel corrected, continuous video representation of the selected scene. This representation may be rendered in two dimensions or three dimensions based on the user needs. This representation may be combined with other remote sensing or ancillary data to produce high information content representations.

The term "data cloud" is used herein to mean a mass data storage service not necessarily on the user's own computing device that a user may access through a known data portal. Through that portal, the user has access to the data in the same manner as if the data physically resided on their computing device. Data cloud interfaces are accessed through a known point of presence and may be offered on a subscription basis to multiple platforms such as laptop computers, desktop computers, smart phone, or tablet computing devices. In various embodiments, the stored data may be information such as text, numeric data, picture or video data, or derived products representing processed forms of the raw data or varied and multiple combinations of data types. The data may be stored in native format or in an encrypted format. In various embodiments, this data storage may be offered by a separate entity or the user's own private or corporate affiliation. In various embodiments, the data cloud point of presence may be accessed via the Internet or other generally available communications method for the user such as a cellular telephone or a corporate network. In various embodiments, the data cloud storage may receive data content from the user, affiliated users, or external data sources such as satellite systems that the user is affiliated with by interest, sharing, or subscription. The data cloud service may offer data backup, access security, redundant entry portals, and other related services for the user.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a computing device thereby enabling it to function as an Internet server (e.g., an enterprise e-mail server) only to the extent necessary to provide the functionality described herein.

Various embodiments may provide systems and methods for achieving continuous measurements (e.g., continuous video images) of the same spot on the Earth using Low Earth Orbit (LEO) satellite constellations and/or Middle Earth Orbit (MEO) satellite constellations. Various embodiments may provide a system of Virtual Low Earth Orbit (LEO) Stationary Satellites (VLSSs) over any area of the Earth for a continuous or a periodic amount of time. Various embodiments may provide a VLSS system including a constellation of LEO satellites each including an instrument payload. The constellation may be configured in one or more orbital planes spread around the Earth containing one or more satellites per plane to effect coverage of the Earth's surface. The constellation may include a large number of LEO satellites, such as one hundred LEO satellites or more. While the LEO satellites in the constellation of LEO satellites may be continually moving relative to the surface of the Earth, at any given time a position on the surface of the Earth may be measurable by one or more instruments in at least one of the instrument payloads. Various embodiments may provide for synthesizing a virtual instrument composed of multiple measurement domains spread across multiple LEO satellites. In this manner, the system including the constellation of LEO satellites each including an instrument payload may provide a VLSS because at least one instrument may provide coverage over a selected area at any given time. The large number of LEO satellites in the system may provide a high level of built-in redundancy.

While various embodiments may be discussed in reference to LEO satellites, LEO satellites are merely one type of satellites, and the LEO satellites may be replaced in the various embodiments with other type satellites, such as Medium Earth Orbit (MEO) satellites, etc., without departing from the spirit or scope of the invention. As such, the various embodiment techniques of utilizing satellite constellations to provide instrument coverage of the Earth's surface described herein equally applies to similarly-configured MEO satellite constellations.

Various embodiments may provide a data cloud interface configured to enable a user to select a user area of interest on the surface of the Earth. In response to the user's selection of a user area of interest on the surface of the Earth via the data cloud interface, satellite commands to the constellation of LEO satellites may be generated to ensure at least one instrument may provide coverage over the user area of interest at any given time. The satellite commands to the constellation of LEO satellites may be generated in response to determining capabilities of available LEO satellites, the paths and/or spacing of available LEO satellites, the viewing fields of available LEO satellites, etc. The satellite commands to the constellation of LEO satellites may direct one or more selected LEO satellites of the various available LEO satellites to gather data at certain times to ensure LEO Staring over the user area of interest is achieved. Different numbers of LEO satellites may be needed to achieve LEO Staring based on various factors, including the data storage capabilities of the satellites, the viewing fields of the satellites, the paths and relative spacings of the satellites, the orbital speed of the satellites, etc. In various embodiments, the data cloud interface may provide a data cloud map enabling the user to draw a user area of interest on a representation of the surface of the Earth in the data cloud map. In various embodiments, the data cloud interface may enable a type of coverage to be selected by the user, such as selecting a number of instrument payloads to use for coverage, selecting a swarming coverage type, etc. In various embodiments, the data cloud interface may indicate attributes of the constellation of LEO satellites, such as data rate, tracking start time, etc. In various embodiments, the data cloud interface may enable user area of interest sizes to be automatically adjusted. In various embodiments, the data cloud interface may enable selection of an object in the user area of interest and the user area of interest may automatically move to track the selected object. In various embodiments, the data cloud interface may enable historical data of the user area of interest to be retrieved from data archives on the LEO satellites and/or at ground terminals. As the instruments of the LEO satellites may always be gathering data, a certain amount of this data may be stored at the LEO satellites as historical data. For example, data for a period of time, such as a week, a day, etc., may be archived. A user may select a history button and the data cloud interface may display this historical data to the user. The VLSS system may analyze the past satellite orbits and then generate and send commands to the instrument payloads of the LEO satellites that flew over the selected user area of interest in the past. The VLSS system may combine those past historical data (e.g., past images) to allow the user to play or rewind data (e.g., visual scenes) from the past (i.e., historical data). In various embodiments, the historical data may reside entirely in memories onboard the LEO satellites. In various embodiments, the historical data may be archived exclusively at ground terminals. In various embodiments, the historical data may be archived partially at the LEO satellites and partially at ground terminals. For example, a historical image archive can be split between the LEO satellites and the ground terminals. This split may be time evolutionary to optimize the use of the satellite data link availability. That is, not all of the data must be transmitted immediately. Data priority and data volume may be used to generate a phasing algorithm for sending, archiving, and archive clearing between the LEO satellites and the ground terminals. Historical data may enable VLSS systems of the various embodiments to look back in time to data that is useful in studying events, such as reviewing data before a volcano eruption. The ability to review historical data may enable a user to review data collected prior to an event occurring to determine how the event may have come to occur. For example, a user could use such a history feature to see what occurred in an area of interest prior to an event occurring.

In various embodiments, the data from the instrument payloads and the constellation of LEO satellites may be continuously sent to ground terminals and/or other satellites. The continuous transfer of data may reduce the need for on-board data storage by the instrument payloads and/or constellation of LEO satellites. In various embodiments, only those LEO satellites selected to provide coverage of a user area of interest may send data to the ground terminals to reduce the data overhead when compared with all LEO satellites sending data at once. In various embodiments, the data transfer methodology may employ data compression techniques to reduce the required bandwidth and/or data error correction techniques to protect against data transmission errors. In various embodiments, one or more instruments in at least one of the instrument payloads of the LEO satellites may be mounted on a gimbal to provide a directional pointing capability to such gimbal mounted instruments. For example, based on instructions from ground terminals and/or on-board software instructions, the direction an instrument is pointing may be adjusted by controlling the gimbal. Such gimbal mounting may enable the field of view of an instrument to be adjusted to cover different locations on the Earth's surface. In other embodiments, one or more instruments in at least one of the instrument payloads of the LEO satellites may be mounted in a fixed configuration (i.e., may not move).

In various embodiments, data from different LEO satellites and/or different angles may be combined to generate three dimensional (3D) images. The 3D images may be panchromatic and/or multispectral. In various embodiments, different types of data may be combined, such as visual data, infrared data, and radar data, to build composite images of the user area of interest.

The VLSS of the various embodiments may provide improvements over conventional systems by effecting the LEO Staring capability, including the capability to monitor any location, a continuous monitoring capability, and continuous tracking capability. The VLSS of the various embodiments may provide improvements over geostationary orbit (GEO) satellites limited ground coverage by providing coverage of any location, variable area coverage sizes, higher latitude coverage, and tracking capability. The VLSS of the various embodiments may provide improvements over LEO satellites operating individually because individual LEO satellites cannot provide the LEO Staring capability resulting in stationary measurements, do not often support high speed two-way data transmission, and require large on-board data storage.

The VLSS of the various embodiments may support LEO Staring and may provide continuous monitoring services to various groups, including the United Nations, News organizations, traffic monitoring services, health care providers, weather organizations, law enforcement, mapping companies, governments, construction companies, farmers, water resource administrators, etc. LEO Staring provided by the various embodiments may be of particular use in providing continuous (i.e., persistent) sensor coverage over a target area or theater of operations.

In various embodiments, the VLSS systems may include advanced computing capabilities enabling the VLSS system to automatically identify interesting new features on the Earth in real-time. The features may be flagged by the VLSS system and reported to ground terminals and user, as well as other LEO satellites. This may enable the viewing schedule to prioritize coverage of these interesting features.

FIG. 1A is a system block diagram of a VLSS system 100 including a constellation of LEO satellites 102 each including an instrument payload 104. FIG. 1A illustrates a portion of the Earth 101 and the constellation of LEO satellites 102 each including an instrument payload 104 orbiting the Earth 101. The instrument payload 104 of each LEO satellite 102 may measure a coverage area 106 of the Earth 101. Together the constellation of LEO satellites 102 may provide coverage of the entire Earth 101. The LEO satellites 102 may have overlapping coverage areas 106, such that at any given time at least one instrument payload 104 may provide coverage over any area of the Earth. The constellation of LEO satellites 102 may include a large number of LEO satellites 102, such as one hundred LEO satellites 102 or more.

An close-up view of one LEO satellite 102 of the constellation of LEO satellites 102 is illustrated in FIG. 1A showing the instrument payload 104 as part of the LEO satellite 102. The LEO satellites 102 may provide high speed two-way data communications with ground terminals on Earth 101. Via connections, such as Internet service and/or cellular connections, to the ground terminals, ground based computing devices may be provided access to the LEO satellites 102. As one example, the constellation of LEO satellites 102 may be a constellation of satellites placed in orbit and managed by the company OneWeb, or similar satellite constellation company. The constellation of LEO satellites 102 may be hosted satellites managed and placed in orbit by one or more entities (e.g., a commercial company, etc.) making payload space available for purchase on the LEO satellites 102 for varied purposes, may be dedicated satellites managed and placed in orbit by one or more entities (e.g., commercial company, government, etc.) with payloads dedicated to a single purpose, and/or may be a mix of hosted and dedicated satellites. In various embodiments, computing devices may establish connection to the ground terminals on Earth 101 to send commands to the LEO satellites 102, such as commands to gather data with one or more instrument in the instrument payload 104 while the LEO satellites 102 are providing coverage for a selected area on the Earth's 101 surface. In various embodiments, ground terminals may be fixed-location terminals and/or mobile terminals.

As the coverage area 106 of any one of the constellation of LEO satellites 102 moves off any given area on the surface of the Earth 101, another one, two, or more LEO satellites 102 with different coverage areas 106 may already be covering that given area on the surface of the Earth 101. This may be achieved because as one LEO satellite 102 may move in orbit such that its coverage area 106 moves off the given area, another LEO satellite 102's coverage area 106 may move onto the given area. By combining the measurements of the instrument payloads 104 of each individual LEO satellite 102 covering that given area of the surface of the Earth 101, continuous monitoring of that given area may be provided for as if a LEO satellite were stationary over that area, i.e., a virtual LEO stationary satellite may be created by the combined LEO satellite 102 measurements thereby achieving LEO Staring. In various embodiments, satellite commands to the LEO satellites 102 may be generated to ensure at least one instrument payload 104 may provide coverage over the user area of interest at any given time. The satellite commands to the LEO satellites 102 may be generated in response to determining capabilities of available LEO satellites 102, the paths and/or spacing of available LEO satellites 102, the coverage areas 106 (e.g., viewing fields) of available LEO satellites 102, etc. The satellite commands to the LEO satellites 102 may direct one or more selected LEO satellites 102 of the various available LEO satellites 102 to gather data at certain times to ensure LEO Staring over a user area of interest is achieved. Different numbers of LEO satellites 102 may be needed to achieve LEO Staring based on various factors, including the data storage capabilities of the LEO satellites 102, the viewing fields of the LEO satellites 102 (i.e., coverage areas 106), the paths and relative spacings of the LEO satellites 102, the orbital speed of the LEO satellites 102, etc.

In various embodiments, the instrument payload 104 may include any one or more different types of instruments. For example, the instrument payload 104 may include one or more camera, one or more radar, one or more thermal imager, one or more solar occultation instrument, one or more magnetic field measuring instrument, one or more spectrometer, one or more multi-spectral imager, etc. As one example, the instrument payload 104 may include a SLIM-6 small spectrometer by Surrey with a 30-meter resolution including a three-band imager, Green (523-605 nm), Red (629-690 nm), and Near Infrared (774-900 nm). The instruments in the instrument payload 104 may be gimbal mounted and/or may be mounted in a fixed position. Commands from ground terminals and/or on-board processors may change the direction/orientation of gimbal mounted instruments. As a specific example, when the instrument payload 104 includes a camera, multiple LEO satellites 102 flying over the same spot on the Earth 101 may each capture an image of the same spot. These images of the same spot may be combined to make a virtual LEO stationary satellite image with LEO Staring capabilities. The virtual LEO stationary satellite images may be LEO Staring records of the same spot on the Earth 101. For example, each LEO satellite 102 may capture 60 seconds of video of the same spot which may be linked together into a single LEO Staring record as one LEO satellite 102 moves out of coverage and the next LEO satellite 102 moves into coverage over that spot. The combined video of 60 second clips captured by each successive LEO satellite 102 over the spot may be a LEO Staring record of continuous video appearing to come from one VLSS and providing LEO Staring over that spot on the Earth 101. In various embodiments, data from different LEO satellites and/or different angles may be combined to generate three dimensional (3D) images on the same spot. The 3D images may be panchromatic and/or multispectral. In various embodiments, different types of data may be combined, such as visual data, infrared data, and radar data, to build composite images of the same spot. In various embodiments, the instrument payload 104 may include calibration instruments. In some embodiments, one LEO satellite 102 may use the calibration instruments to calibrate its own respective other instruments in the instrument payload 104 and may send calibration data to others of the LEO satellites 102 to enable those LEO satellites 102 to calibrate their own respective instruments. In this manner, calibration from one LEO satellite 102 may be used to calibrate other LEO satellites 102. In various embodiments, the instrument suite may be designed as modular instrument suite with standardized mechanical, data, power, and control interfaces to permit upgrades and refinements to be phased in with the host spacecraft refreshes to the host satellite constellation, to permit replacement of failed units, and to permit technology advances to be applied.

Figure 1B:
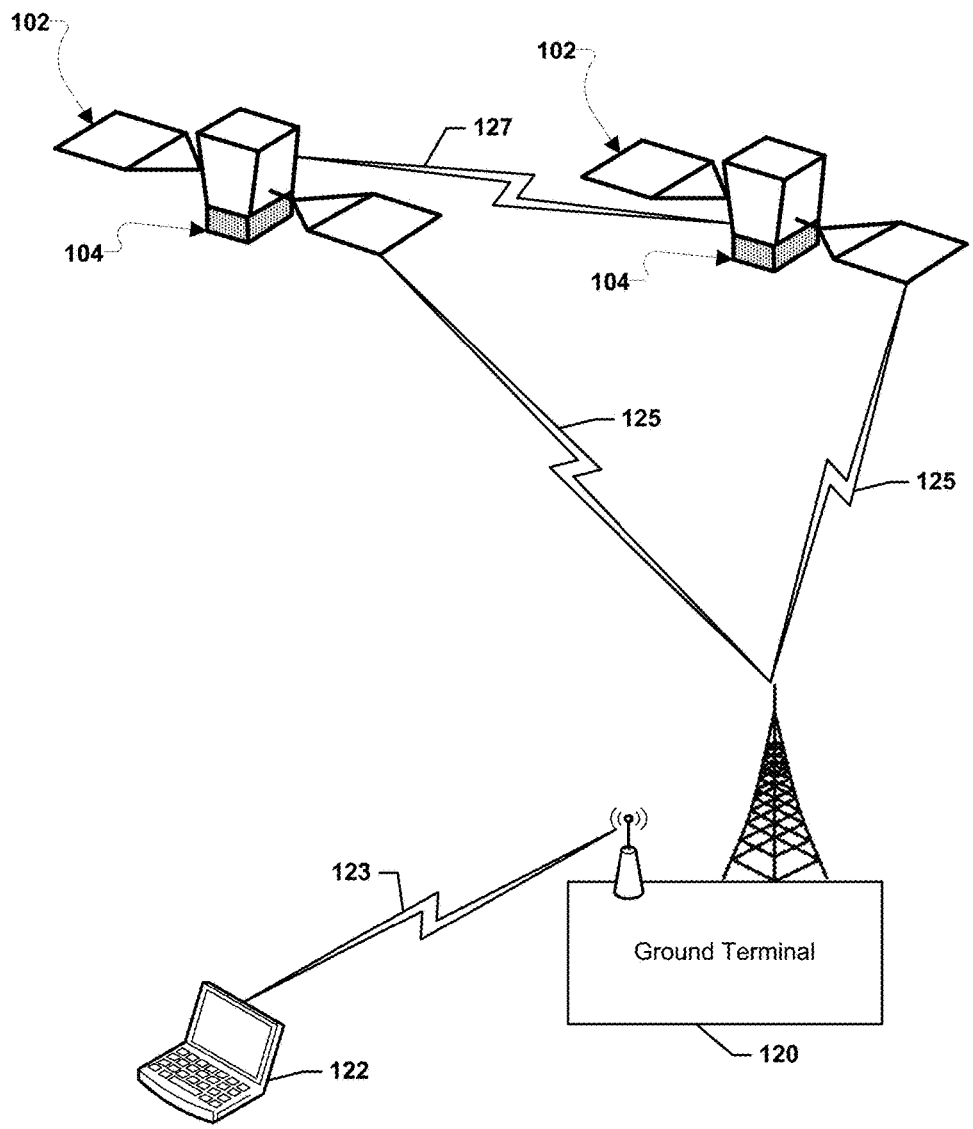
FIG. 1B is a communication block diagram of components of the system of FIG. 1A.

FIG. 1B illustrates aspects of the system 100 illustrated in FIG. 1A, including the LEO satellites 102, a ground terminal 120, and a user's computing device 122. With reference to FIGS. 1A and 1B, the user's computing device 122 may establish a connection 123 to the ground terminal 120, such as a wired or wireless connection (e.g., cellular, Wi-Fi, Ethernet, etc.). The ground terminal 120 may establish a respective connection 125 with each LEO satellite 102. In some embodiments the connections 125 may be line of sight limited and connections between any given LEO satellite and the ground terminal 120 may be periodically established and disestablished. In various embodiments, more than one ground terminal 120 may be present on the surface of the Earth 101 and the LEO satellites 102 may establish different connections 125 with different ground terminals 120 as connections become possible. The ground terminals 120 may be either fixed-location or mobile, as required by the application. The LEO satellites 102 may also establish connections 127 with one another. Via the connections 123, 125, and 127 the various devices, such as the LEO satellites 102, ground terminal 120, and user's computing device 122 may exchange data with one another. In some embodiments, the connections 125 and 127 may be high data rate wireless connections. In various embodiments, the connections 127 between LEO satellites 102 may be used to transmit data to/from the ground terminal 120. LEO satellites 102 may route data among one another via their various connections 127 and one of the LEO satellites 102 in communication with the ground terminal 120 may forward the data to the ground terminal 120 or forward data from the ground terminal 120 to other LEO satellites. In this manner, though one LEO satellite 102 may not be able to establish a connection with a ground terminal 120 at a given time, data may still be sent to/from the LEO satellite 102 via other LEO satellites' 102 connections to the ground terminal 120. In various embodiments, the LEO satellites 102 and/or the ground terminals 120 may archive historical data of the Earth gathered by the instrument payloads 104. Data priority and data volume can be used to generate a phasing algorithm for sending, archiving, and archive clearing between the LEO satellites 102 and the ground terminals 120. In various embodiments, the operators of the ground terminals 120 may send real-time data and history data gathered from the various cooperarting satellites for storage at a data cloud server for access by the users.

In various embodiments, an application running on a processor of the user's computing device, such as a data cloud interface application, may enable a user to generate a VLSS for a given area on the surface of the Earth 101. The data cloud interface application may enable the user to select a given area on the surface of the Earth 101 for monitoring, and the data cloud interface application may generate commands for the LEO satellites 102 to cause the LEO satellites 102 to gather data over the given area on the surface of the Earth 101 and cause that data to be deposited with the data cloud server. In various embodiments, the data cloud interface application may provide a graphical user interface (GUI), such as a data cloud interface, configured to enable a user to select a user area of interest on the surface of the Earth 101 via his or her computing device 122. In response to the user's selection of a user area of interest on the surface of the Earth 101 via the data cloud interface, satellite commands to the constellation of LEO satellites 102 may be generated by the data cloud interface application running on the processor of the computing device 122 to ensure at least one instrument from an instrument payload 104 may provide coverage over the user area of interest at any given time and cause data to be returned for storage with the data cloud server. In various embodiments, the data cloud interface may provide a data cloud map as part of the GUI that enables the user to draw a user area of interest on a representation of the surface of the Earth 101 in the data cloud map. In various embodiments, the data cloud interface may enable a type of coverage to be selected by the user, such as selecting a number of instrument payloads to use for coverage, selecting a virtual swarming coverage type, etc. and cause that data to be stored with the data could server. In various embodiments, the data cloud interface may indicate attributes of the constellation of LEO satellites 102, such as data rate, tracking start time, etc. In various embodiments, the data cloud interface may enable user area of interest sizes to be automatically adjusted. In various embodiments, the data cloud interface may enable selection of an object in the user area of interest and the user area of interest may automatically move to track the selected object and store the acquired data with the data cloud server. In various embodiments, the data cloud interface may enable users to request and view historical data related to the user area of interest.

Figure 2A:
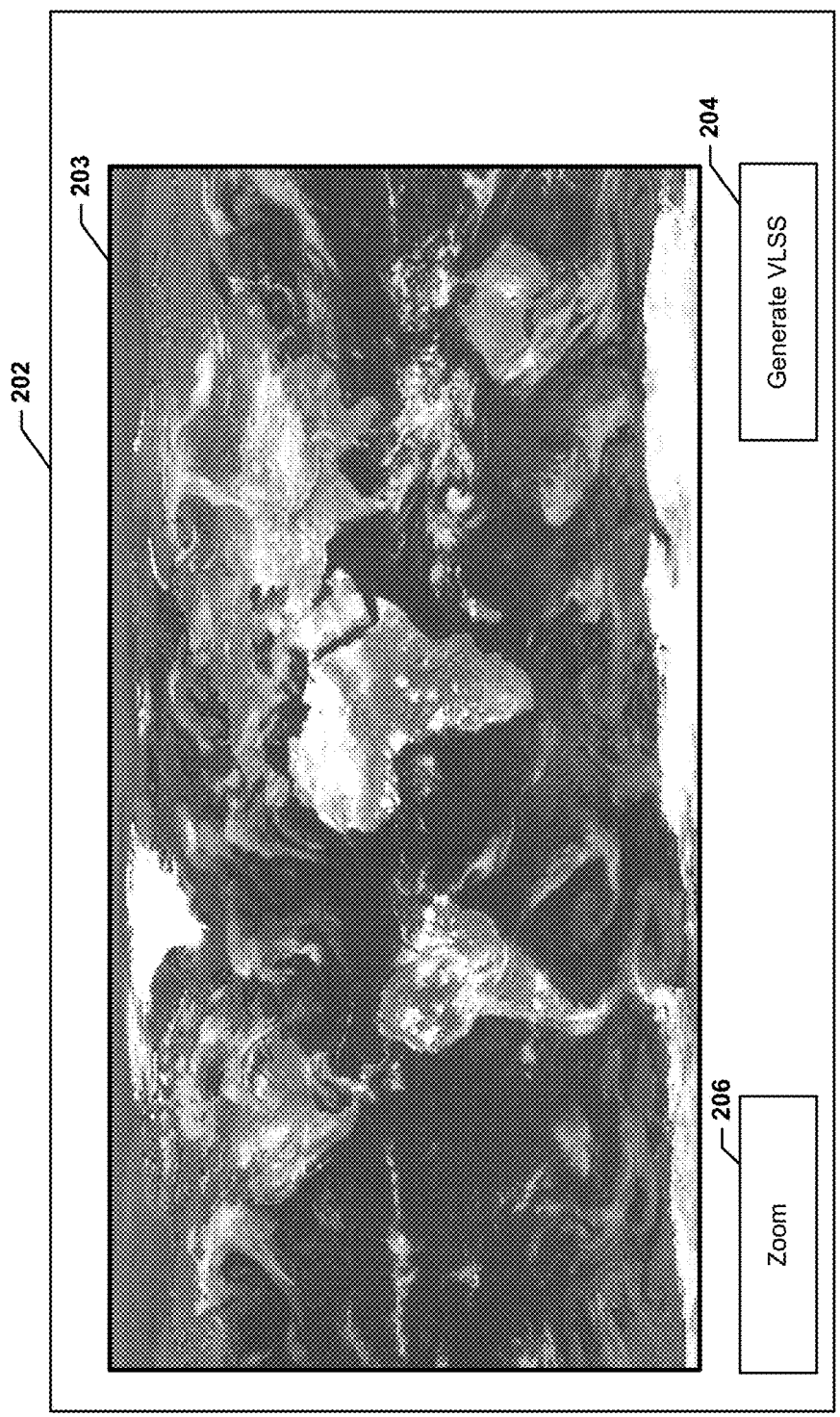
FIGS. 2A-2C illustrate aspects of a data cloud interface according to various embodiments.
Figure 2B:
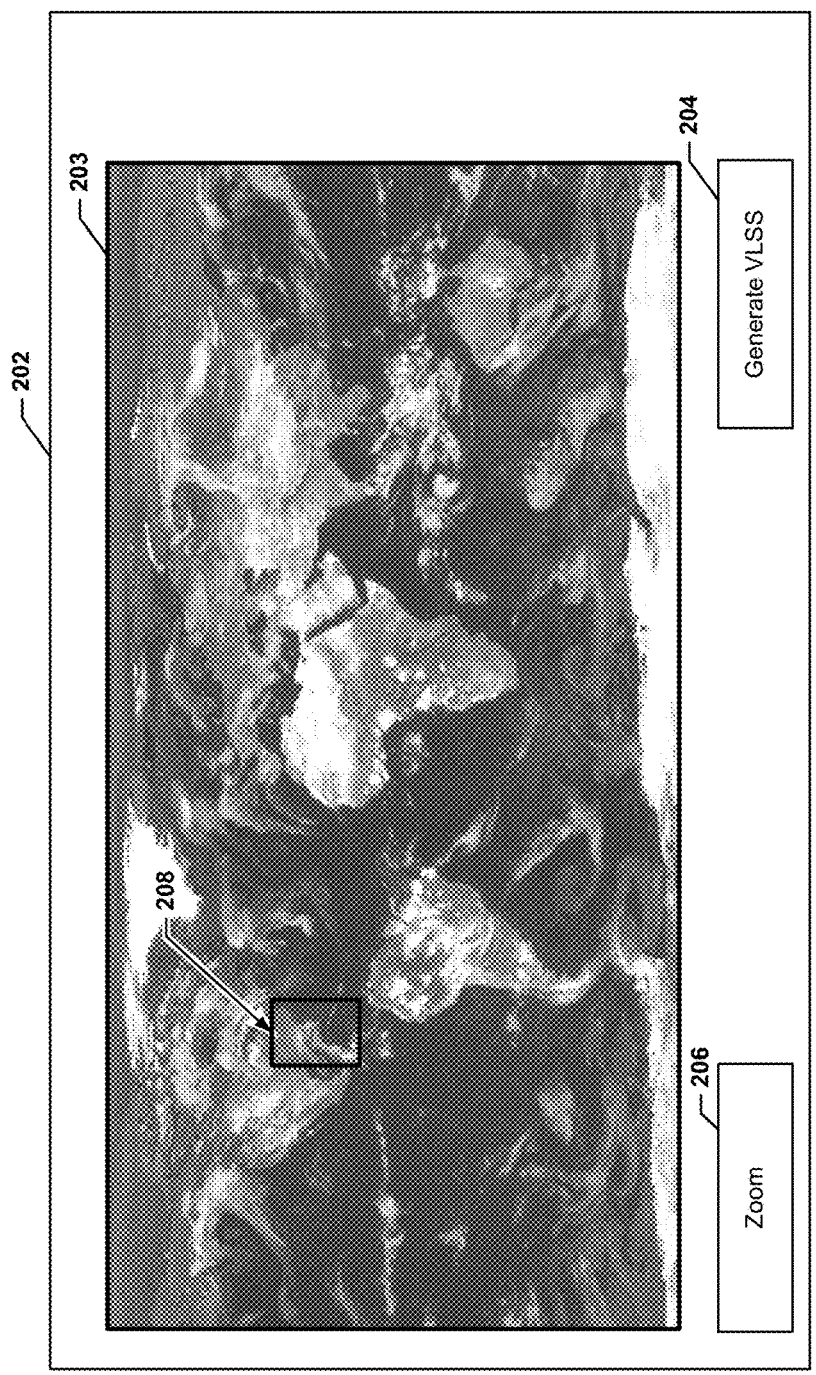
Figure 2C:
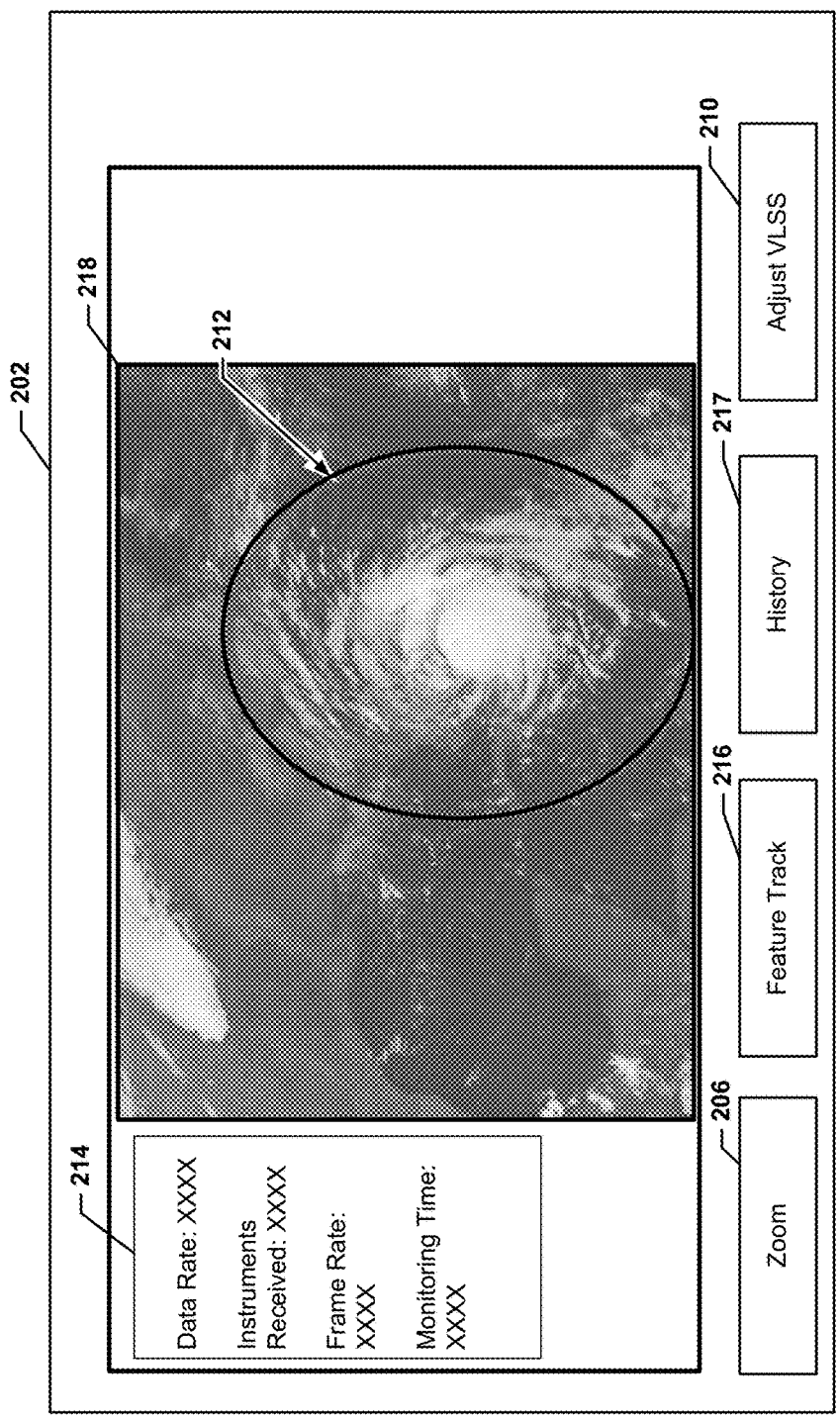

FIGS. 2A, 2B, and 2C illustrate example aspects of a data cloud interface 202 according to various embodiments. In various embodiments, the data cloud interface 202 may be a GUI generated by a data cloud interface application running on the processor of the computing device 122. With reference to FIGS. 1A-2C, FIG. 2A illustrates an initial view of the data cloud interface 202 generated before any selection of a user area of interest. The data cloud interface 202 may include a data cloud map 203 and various buttons, such as a zoom button 206 and a generate VLSS button 204. The data cloud map 203 may be a map of the Earth 101 generated from a subset of the data being gathered by the constellation of LEO satellites 102. For example, around a dozen LEO satellites 102 may continually be gathering data and that data from the dozen LEO satellites 102 are sent to the data cloud server where those data may be used by the data cloud interface application to generate the initial data cloud map 203 providing global coverage. More than a dozen LEO satellites 102 may be used for continual monitoring. However, the more satellites gathering data and attempting to relay that data to the ground terminals 120 at a time, the greater the bandwidth use may be and the bandwidth of the system may be exceeded if all instrument payloads 104 were always sending down data to the ground terminal 120 for deposit with the data cloud server.

FIG. 2B illustrates a view of the data cloud interface 202 generated after a user selection of a user area of interest 208. The user may interact with the data cloud map 203, such as by using a mouse pointer, finger on a touch screen, etc., to draw an area of interest 208 on the data cloud map 203. While illustrated as a rectangle in FIG. 2B, the user area of interest 208 may be any shape. The user may select the Generate VLSS button 204 to cause the data cloud interface application to generate commands to the LEO satellites to send down all data from any instrument of an instrument payload 104 that passes through the user area of interest 208 and cause that data to be deposited with the data cloud server. In various embodiments, when the user selects the Generate VLSS button 204, the user may be prompted to select attributes for the VLSS to be generated. For example, the data cloud interface application may enable the user to select a type of coverage, such as selecting a number of instrument payloads to use for coverage, selecting a virtual swarming coverage type, selecting a frame rate to use, etc. and thereby cause the data to be gathered and sent to the data cloud server.

FIG. 2C illustrates a view of the data cloud interface 202 generated once data for the user area of interest 208 is received. The VLSS 218 of the user area of interest 208 may be displayed to the user. The VLSS 218 may replace the data cloud map 203 or may be an updated version of the data cloud map 203 displaying data from the user area of interest 208. The VLSS 218 may be a user interface element of the data cloud interface 202 displaying gathered data for the user area of interest 208. The data displayed in the VLSS 218 may come from different instrument payloads 104 as different LEO satellites 102 pass over the user area of interest 208 and send the data to the data cloud server. The data from the different instrument payloads 104 may be combined to generate a continuous measurement (e.g., a continuous image, etc.) of the user area of interest 208. The data from two or more of the different instrument payloads 104 and/or different angles may be combined to generate three dimensional images of the user area of interest 208. The three-dimensional images may be panchromatic and/or multispectral. In various embodiments, different types of data may be combined, such as visual data, infrared data, and radar data, to build composite images of the user area of interest 208 that may be displayed in the VLSS 218. Data about the VLSS 218 may also be displayed in data fields 214. In various embodiments, the data cloud interface application may indicate attributes of the LEO satellites 102 monitoring the area of interest 208 in the data fields 214, such as data rate, tracking start time, frame rate, indication of the number/type of instruments data is received from, etc. In various embodiments, the data cloud interface application may enable user area of interest sizes to be automatically adjusted, such as by the zoom button 206. In various embodiments, the user may adjust attributes of the VLSS 218 by selecting the adjust VLSS button 210. In response to selection of the adjust VLSS button 210, the data cloud interface application may display a menu selection allowing the user to adjust the VLSS 218. For example, the user may adjust the frame rate of the VLSS coverage by selecting the adjust VLSS button 210.

In various embodiments, the data cloud interface application may enable selection of an object 212 in the user area of interest 208 and the VLSS 218 may automatically move to track the selected object and cause the data to be sent to the data cloud server. For example, the user may interact with the VLSS 218, such as by using a mouse pointer, finger on a touch screen, etc., to draw an object selection 212 on the VLSS 218. While illustrated as an oval in FIG. 2C, the object selection 212 may be any shape. The user may select the Feature Track button 216 to cause the data cloud interface application to generate commands to the LEO satellites to move the VLSS 218 to track the object as the object within the object selection 212 moves. For example, when the object selection 212 covers a hurricane the VLSS 218 may move as the hurricane moves in real-time. The tracking of the object within the object selection 212 may be based on thermal feature tracking, object shape tracking, change tracking, device (e.g., cell phone) tracking, or any other type of tracking. While the VLSS 218 may move, the LEO satellites themselves may not change their orbital dynamics (e.g., orbital paths, speeds, etc.). Rather, data from additional LEO satellites providing coverage over the object selection 212 as it moves may be received and displayed. In this manner, the VLSS 218 may display new data and give the appearance of movement, without needing any LEO satellites to change their orbital dynamics (e.g., orbital paths, speeds, etc.).

In various embodiments, the data cloud interface application may enable generation of a historical VLSS. In various embodiments, the data from the different instrument payloads 104 may be stored at the different LEO satellites 102 for a period of time, such as a week's worth of data, a day's worth of data, etc. This stored data may be historical data for all areas of the Earth over which the different LEO satellites 102 passed in the period of time. The user may interact with the data cloud interface 202 by selecting a history button 217. In response to the user's selection of the history button 217, the data cloud interface application may generate and send commands to the LEO satellites to send historical data for the user area of interest 208. The historical data may be displayed in the VLSS 218, thereby enabling the user to effectively rewind the data for the user area of interest 208 to see how the user area of interest 208 looked in the past. In some embodiments, historical data from the different instrument payloads 104 may be archived at the ground terminal 120. Rather than waiting for commands to be received to send historical data, the LEO satellites may periodically send historical data to the ground terminal 120 for archiving. In such embodiments, when the user selects the history button 217, a combination of archived data at the ground terminal 120 and, if needed, historical data from the different LEO satellites 102 may be combined to generate the historical data displayed in the VLSS 218. In this manner, satellite data link availability may be optimized as historical data need not be transmitted from the different LEO satellites 102 immediately when the history button 217 is selected. Data priority and data volume can be used to generate a phasing algorithm for sending, archiving, and archive clearing between the different LEO satellites 102 and the ground terminal 120.

Figure 3A:
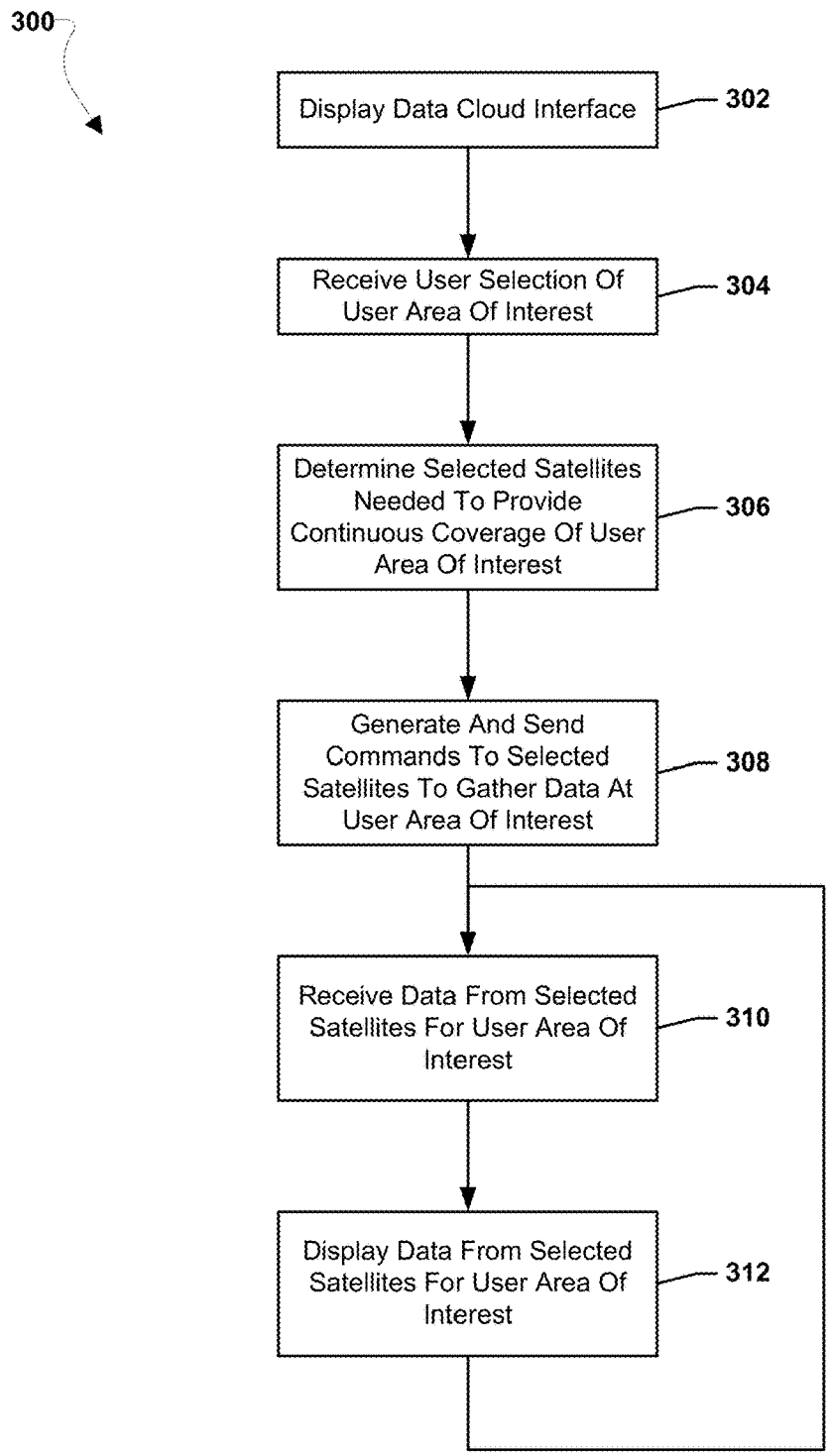
FIG. 3A is a process flow diagram illustrating an embodiment method for generating a VLSS.

FIG. 3A is a process flow diagram illustrating an embodiment method 300 for generating a VLSS. In various embodiments, the operations of method 300 may be performed by a data cloud interface application running on a processor of a computing device, such as the user's computing device 122. In various embodiments, the operations of method 300 may be performed via a Web browser application having access to the data cloud server.

With reference to FIGS. 1A-3A, in block 302 the processor may display a data cloud interface. For example, the data cloud interface may be a GUI as described above. In block 304 the processor may receive a user selection of a user area of interest. For example, the selection may be generated in response to the user drawing an area on a data cloud map displayed in the data cloud interface and selecting a generate VLSS button.

In block 306 the processor may determine the selected satellites needed to provide continuous coverage of the user area of interest. The selected satellites may be a number of satellites needed to provide continuous coverage of the user area of interest. The number of selected satellites may be equal to all satellites with orbits passing over the area of interest. In block 308 the processor may generate and send commands to the selected satellites to gather data at the user area of interest. As an example, the command may be a command indicating the parameters of the user area of interest, such as latitudes and longitudes defining the area, and indicating that data is to be gathered over that area. In various embodiments, the processor may send the commands to a ground terminal, such as ground terminal 120, which may in turn send the commands to the selected LEO satellites. In response to receiving the commands, the LEO satellites may gather the data over the user area of interest, and as the data is gathered send the data to the ground terminal. The ground terminal may forward the data to the computing device's processor or to the data cloud server.

In block 310 the processor may receive data from the selected satellites for the user area of interest. Data may be received continually from different LEO satellites as the different satellites pass over the area of interest or from the data server in either real-time or history recovery modes. In block 312, the processor may display the data from the selected satellites for the user area of interest. In this manner, the processor may generate a VLSS output to the user. Data may be continually received and the operations of block 310 and 312 may be performed in a continual loop as new data is received either directly or via the data cloud server. In various embodiments, data from different LEO satellites and/or different angles may be combined to generate three dimensional (3D) images and effect the LEO Staring capability. The 3D images may be panchromatic and/or multi-spectral. In various embodiments, different types of data may be combined, such as visual data, infrared data, and radar data, to build composite images of the user area of interest and these composite images may be displayed to the user.

Figure 3B:
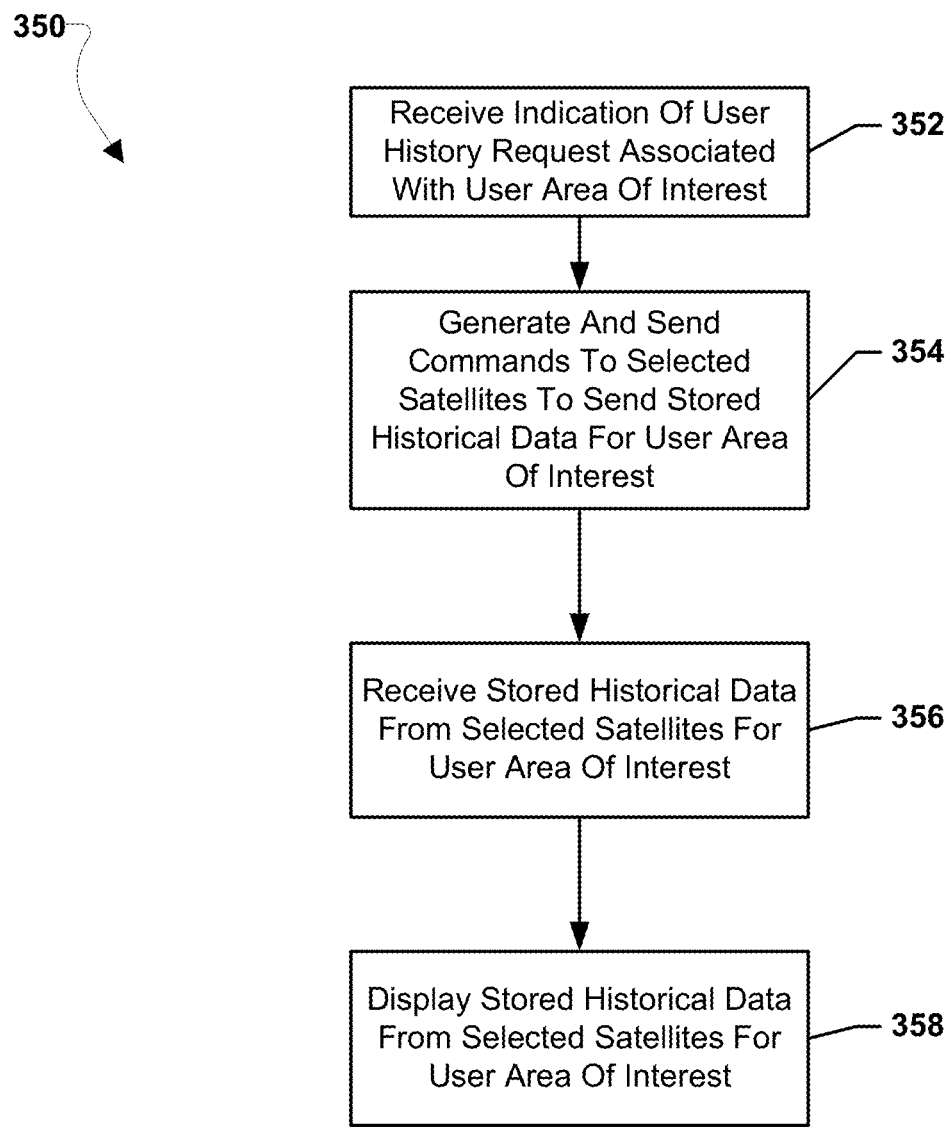
FIG. 3B is a process flow diagram illustrating an embodiment method for generating a historical VLSS.

FIG. 3B is a process flow diagram illustrating an embodiment method 350 for generating a historical VLSS. In various embodiments, the operations of method 350 may be performed by a data cloud interface application running on a processor of a computing device, such as the user's computing device 122. In various embodiments, the operations of method 350 may be performed in conjunction with the operations of method 300 (FIG. 3A).

With reference to FIGS. 1A-3B, in block 352 the processor may receive an indication of a user history request associated with the user area of interest. For example, the indication may be generated in response to a user selecting a history button in a data cloud interface of a GUI as described above.

In block 354 the processor may generate and send commands to the selected satellites to send stored historical data for the user area of interest. The selected satellites may be the same satellites as determined in block 306 of method 300 (FIG. 3A). As the instruments of the LEO satellites may always be gathering data, a certain amount of this data may be stored at the LEO satellites as historical data. For example, data for a period of time, such as a week, a day, etc., may be archived. The processor may generate and send commands to the selected satellites to cause those satellites to send their archived data for the user area of interest.

In block 356 the processor may receive the stored historical data from the selected satellites for the user area of interest. In block 358 the processor may display the stored historical data from the selected satellites of the user area of interest. In this manner, the processor may generate a historical VLSS output to the user. The historical VLSS output may be a historical LEO Staring record formed from the combined historical data for the selected satellites of the user area of interest. For example, the LEO staring record may be a historical visual scene of the user area of interest.

Data cloud interface applications of the various embodiments may have many useful applications. As one example, VLSSs may be created to monitor pollution over major cities. As another example, storms, such as hurricanes, tornados, etc., may be tracked in real-time by VLSSs. As a specific example, thermal feature tracking may be used on tornados and tornado damage tracking may be provided to first responders. As another example, thermal tracking may be used with VLSSs to track fires. The VLSS area may be expanded as the fire expands. As a further example, by using many solar occultation instruments, a system according to the various embodiments may be configured to continually view sunrise or sunset. This may result in a continuous measurement using sunsets and sunrises. In some embodiments, simultaneous solar occultation measurements from different angles may be merged. As an example, the various embodiments may be used for heliophysics. By using many instruments on the space and nadir sides of the LEO satellite constellation, staring at the Van Allen Belts and Norther/Southern lights could be achieved. The various embodiments may be used for ice monitoring of glaciers, Greenland, etc. The various embodiments may be used for monitoring and tracking of NASA rocket launches. A VLSS area could be drawn around the launch pad and thermal tracking may follow the rocket as it goes into space while staring straight down or at an angle. This rocket tracking may be useful when rocket telemetry is lost. In a similar manner, the various embodiments may be used to track planes, especially over the ocean away from land masses. Various embodiments may also track tidal waves and tsunamis, track and monitor road traffic due to floods, and to monitor and aid in relief of natural disasters.

Data cloud interface applications of the various embodiments may have many useful applications. The various embodiments may enable tracking with feature tracking used as the tracked element of interest moves. The various embodiments may enable border monitoring. A VLSS may act as a type of virtual border in the sky with feature tracking to detect any movement and then generating warnings (e.g., change the VLSS area to red, flashing, etc., and/or by sending out warning messages, etc.). The various embodiments may enable ship or equipment movement to be tracked. The various embodiments may enable Global Positioning System (GPS) tracking of a subject. For example, a subject's cell phone GPS location may be snooped, and that GPS location used as the center of the VLSS. As the subject then moves, the VLSS may follow the subject. The various embodiments may enable the monitoring of weather threats to assets of interest.

Figure 4:
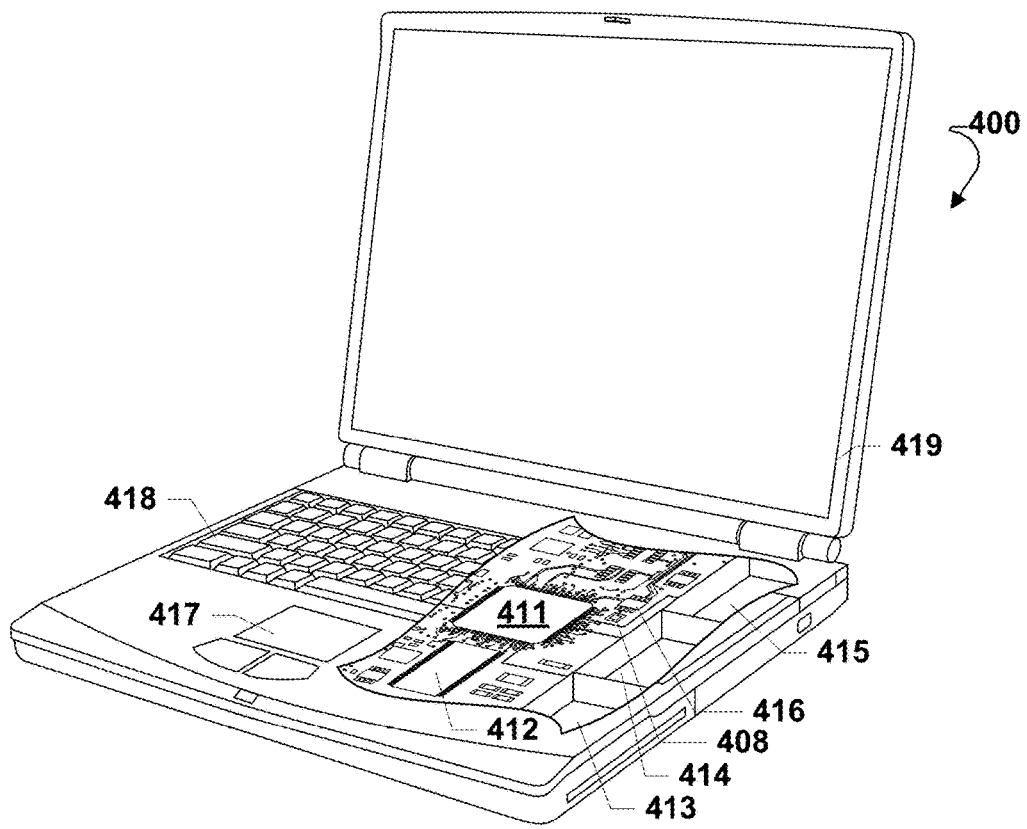
FIG. 4 is a component block diagram of a computing device suitable for use with the various embodiments.

The various embodiments described above may also be implemented within a variety of computing devices, such as a laptop computer 400 illustrated in FIG. 4 or through Web browser based applications running on the computing device. The laptop computer 400 may be one example of a user's computing device 122 running a data cloud interface application on a processor as described above. Many laptop computers include a touchpad touch surface 417 that serves as the computer's pointing device, and thus may receive drag, scroll, and flick gestures similar to those implemented on mobile computing devices equipped with a touch screen display and described above. A laptop computer 400 will typically include a processor 411 coupled to volatile memory 412, a large capacity nonvolatile memory, such as a disk drive 413 of Flash memory, and networking connectivity utilizing Ethernet. Additionally, the computer 400 may have one or more antennas 408 for sending and receiving electromagnetic radiation that may be connected to a wireless data link and/or cellular telephone transceiver 416 coupled to the processor 411. The computer 400 may also include a removable read/write storage devices, such as a compact Flash drive 414 and a compact disc (CD) drive 415, coupled to the processor 411. In a notebook configuration, the computer housing includes the touchpad 417, the keyboard 418, and the display 419 all coupled to the processor 411. Other configurations of the mobile computing device may include a computer mouse or trackball coupled to the processor (e.g., via a USB input) as are well known, which may also be used in conjunction with the various embodiments.

The processor 411 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 411. The processor 411 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 411 including internal memory or removable memory plugged into the device and memory within the processor 411 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A satellite-based sensing system, operable by a user, comprising:
one or more sensors to generate real-time remote sensing data;
the one or more sensors mounted on a non-geostationary constellation of satellites having a sufficient number of orbital planes and satellites per orbital plane such that each location on the Earth has at least one satellite over said location's horizon at all times to maintain continuous observation of the Earth and production of the real-time remote sensing data, and to provide fields of view without the distortions produced by a geostationary satellite;
storage of the real-time and historical data, produced by the one or more sensors, in one or more storage devices located in at least one of: one or more satellites or one or more ground terminals located on Earth, the multiple storage devices forming a data cloud;
a communications infrastructure connecting the constellation of satellites, the one or more ground terminals, and the data cloud for data collection and control, and user access;
a user interface to control the data collection and control, and the user access to at least one of the real-time data or the historical data; and
a computing device to receive a user selection of a user area of interest and to generate and send commands to selected satellites via the communications infrastructure to cause the selected satellites to use their respective sensors to gather data at the user area of interest, and wherein the computing device is in communication with the data cloud to receive and process the data to form derivative data products from the data in the data collection to meet the user needs, further wherein the data appear to the user to be continuously collected from a fixed observation point above a user area of interest on Earth.

2. The system of claim 1, wherein the one or more ground terminals communicate directly with one or more of the satellites of the constellation of satellites and the constellation of satellites are configured to communicate with one another.

3. The system of claim 1, wherein the number of satellites is a number equal to all satellites of the constellation of satellites passing over the user area of interest.

4. The system of claim 1, wherein the constellation of satellites is a constellation of medium earth orbit (MEO) satellites.

5. The system of claim 1, wherein the constellation of satellites is a constellation of low earth orbit (LEO) satellites.

6. The system of claim 5, wherein the computing device is further configured to:
display the data products on a virtual LEO stationary satellite (VLSS) interface element to a user.

7. The system of claim 6, wherein the computing device is further configured to:
receive the user area of interest within the VLSS interface element; and
generate and send commands to selected LEO satellites of the constellation of LEO satellites via the communications infrastructure to cause the selected LEO satellites to use their respective sensors to gather data of the user area of interest, wherein the selected LEO satellites are one or more LEO satellites with orbital paths that pass over the user area of interest as the LEO satellites move; wherein the successive LEO satellites passing over the user area of interest provide a continuous data record for the user area of interest.

8. A method for generating a satellite-based sensing system, operable by a user, comprising:
mounting one or more sensors, generating real-time remote sensing data, on a non-geostationary constellation of satellites having a sufficient number of orbital planes and satellites per orbital plane such that each location on the Earth has at least one satellite over said location's horizon at all times to maintain continuous observation of the Earth and produce of the real-time remote sensing data, and to provide fields of view without the distortions produced by a geostationary satellite;
storing real-time and historical data, produced by the one or more sensors, in one or more storage devices located in at least one of: one or more satellites or one or more ground terminals located on Earth, the multiple storage devices forming a data cloud;
providing a communications infrastructure to connect the constellation of satellites, the one or more ground terminals, and the data cloud for data collection and control, and user access;
providing a user interface to control the data collection and control, and the user access to at least one of the real-time data or the historical data; and
providing a computing device to receive a user selection of a user area of interest and to generate and send commands to selected satellites via the communications infrastructure to cause the selected satellites to use their respective sensors to gather data at the user area of interest, and wherein the computing device is in communication with the data cloud to receive and process the data to form derivative data products from the data in the data collection to meet the user needs, wherein the data appear to the user to be continuously collected from a fixed observation point above a user area of interest on Earth.

9. The method of claim 8, wherein the constellation of satellites is a constellation of medium earth orbit (MEO) satellites.

10. The method of claim 8, wherein the constellation of satellites is a constellation of low earth orbit (LEO) satellites.

11. The method of claim 10, further comprising:
displaying the data products on a virtual LEO stationary satellite (VLSS) interface element to a user.

12. The method of claim 11, further comprising:
receiving a user selection of an object within the VLSS interface element; and
generating and sending commands to selected LEO satellites of the constellation of LEO satellites via the data cloud to cause the selected LEO satellites of the constellation of LEO satellites to use their respective sensors to gather data of an area the object is in, wherein the selected LEO satellites of the constellation of LEO satellites are one or more LEO satellites of the constellation of LEO satellites with orbital paths that pass over the object as the object moves.

13. The method of claim 12, wherein the one or more ground terminals is configured to communicate directly with one or more of the LEO satellites of the constellation of LEO satellites and the constellation of LEO satellites are configured to communicate with one another.

14. The method of claim 13, wherein the number of satellites is a number equal to all LEO satellites of the constellation of LEO satellites passing over the user area of interest.

15. The method of claim 14, further comprising combining remote sensing visual scene data from two or more of the LEO satellites of the constellation of LEO satellites passing over the user area of interest to generate a LEO Staring three-dimensional video data record.

16. The method of claim 11, further comprising:
receiving an indication of a user history request associated with the user area of interest;
generating and sending commands to the constellation of LEO satellites via the data cloud to cause the constellation of LEO satellites to send stored historical data for the user area of interest to the data cloud;
receiving the stored historical data from the selected LEO satellites via the data cloud; and
displaying the stored historical data on the VLSS interface element to the user.

17. A Virtual Low Earth Orbit (LEO) Stationary Satellite (VLSS) graphical user interface, comprising:
a data cloud map to receive a user selection of an area of interest on a map of Earth; and
a VLSS interface element to display data continuously gathered by a constellation of LEO satellites of the area of interest after the user selection of the area of interest is received;
wherein the LEO satellites have a sufficient number of orbital planes and satellites per orbital place such that each location on the Earth has at least one satellite over the location's horizon at all times to maintain and generate continuous observations of the Earth and produce the data in real-time;
wherein the data appear to the user to be continuously collected from a fixed observation point above the user area of interest on Earth;

and wherein fields of view are provided without the distortions produced by a geostationary satellite.

18. The graphical user interface of claim 17, wherein the VLSS interface element is further configured to:
  receive the user area of interest for tracking by the constellation of LEO satellites; and
  display the historical data gathered by the constellation of LEO satellites of the user area of interest, wherein the historical data is a LEO Staring record of a visual scene.

\* \* \* \* \*